(12) United States Patent
Lynch

(10) Patent No.: US 12,396,595 B2
(45) Date of Patent: Aug. 26, 2025

(54) ELEVATED RACK DEVICE

(71) Applicant: Belinda Lynch, Westerville, OH (US)

(72) Inventor: Belinda Lynch, Westerville, OH (US)

( * ) Notice: Subject to any disclaimer, the term of this patent is extended or adjusted under 35 U.S.C. 154(b) by 443 days.

(21) Appl. No.: 17/895,228

(22) Filed: Aug. 25, 2022

(65) Prior Publication Data

US 2024/0065482 A1 Feb. 29, 2024

(51) Int. Cl.
*A47J 43/00* (2006.01)
*A47J 37/06* (2006.01)

(52) U.S. Cl.
CPC .............. *A47J 43/00* (2013.01); *A47J 37/067* (2013.01); *A47J 37/0688* (2013.01); *A47J 37/0694* (2013.01)

(58) Field of Classification Search
CPC ........ A47J 37/04; A47J 37/041; A47J 37/049; A47J 37/067; A47J 37/0688; A47J 37/0694; A47J 37/07; A47J 37/0786; A47J 43/00; A47J 43/18
See application file for complete search history.

(56) References Cited

U.S. PATENT DOCUMENTS

| | | | | |
|---|---|---|---|---|
| 3,532,225 | A | * 10/1970 | Reed | A47F 5/13 211/69.9 |
| 5,913,440 | A | 6/1999 | Bobko | |
| 6,668,708 | B1 | * 12/2003 | Swinford | A47J 37/0694 99/449 |
| 6,945,161 | B1 | * 9/2005 | Battaglia | A47J 43/18 99/426 |
| 7,281,469 | B1 | 10/2007 | Barbour | |
| D612,693 | S | 3/2010 | Accardo | |
| D666,872 | S | 9/2012 | Maher | |
| 8,621,988 | B1 | 1/2014 | O'Dea | |
| 9,801,490 | B1 | 10/2017 | Legler | |
| 2006/0266227 | A1 | 11/2006 | Britt | |

FOREIGN PATENT DOCUMENTS

CA 2237868 11/1999

* cited by examiner

*Primary Examiner* — Hung D Nguyen

(57) ABSTRACT

An elevated rack device for preparing food includes a base to which a plurality of uprights is attached. Each upright extends substantially perpendicularly from the base proximate to a first end of the base. A rack is attached to the plurality of uprights distal from the base and extends substantially colinearly with the base toward a second end of the base. A food item can be positioned on a top of the rack with surfaces of the food item being substantially accessible to a user and the food item being slidable from the rack.

7 Claims, 4 Drawing Sheets

ELEVATED RACK DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to elevated rack devices and more particularly pertains to a new elevated rack device for preparing food. The present invention discloses an elevated rack device that facilitates manipulation of a food item positioned upon a rack of the elevated rack device.

(2) Description of Related Art Including Information Disclosed Under 37 CFR 1.97 and 1.98

The prior art relates to elevated rack devices, which may comprise racks attached to, or attachable to, bases by both of their ends, holding devices, such as spits, which are insertable into turkeys, chickens, and the like, as well as stands for deep frying. What is lacking in the prior art is an elevated rack device comprising a base, to which a plurality of uprights is attached. A rack is attached to the plurality of uprights distally from the base and extends substantially colinearly with the base toward a second end of the base. In effect, only one end of the rack is attached to the base, allowing a bag to be positioned over the rack and a food item positioned on the rack, such as a turkey.

BRIEF SUMMARY OF THE INVENTION

An embodiment of the disclosure meets the needs presented above by generally comprising a base to which a plurality of uprights is attached. Each upright extends substantially perpendicularly from the base proximate to a first end of the base. A rack is attached to the plurality of uprights distal from the base and extends substantially colinearly with the base toward a second end of the base. A top of the rack is configured for positioning of a food item, such as a turkey, a chicken, a ham, or the like, with surfaces of the food item being substantially accessible to a user and the food item being slidable from the rack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
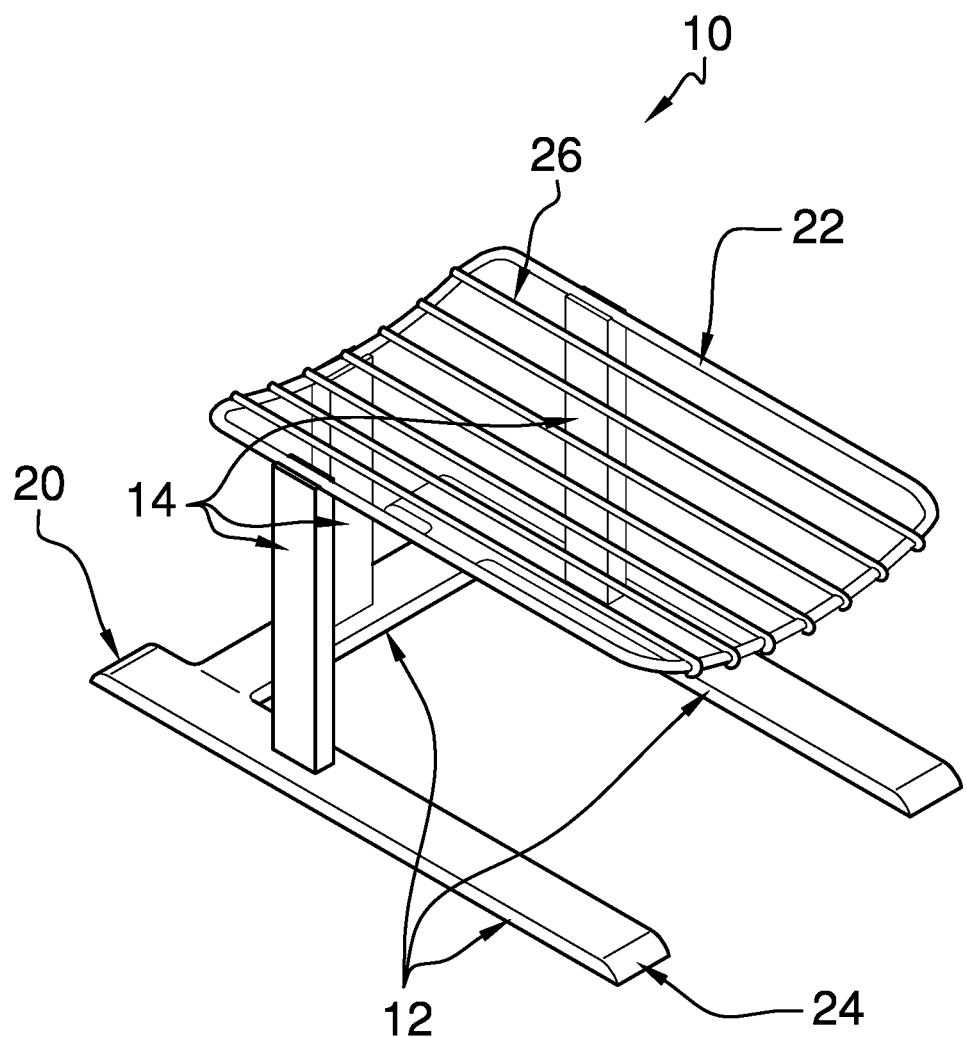
FIG. 1 is an isometric perspective view of an elevated rack device according to an embodiment of the disclosure.

With reference now to the drawings, and in particular to FIGS. 1 through 5 thereof, a new elevated rack device embodying the principles and concepts of an embodiment of the disclosure and generally designated by the reference numeral 10 will be described.

As best illustrated in FIGS. 1 through 5, the elevated rack device 10 generally comprises a base 12, to which a plurality of uprights 14 is attached. The base 12 comprises a pair of side members 16 and a crossmember 18. The crossmember 18 is attached to and extends between the side members 16 proximate to a first end 20 of the base 12. Each upright 14 extends substantially perpendicularly from the base 12 proximate to the first end 20 of the base 12. The plurality of uprights 14 comprises an upright 14 that is attached to the crossmember 18 equally distant from the side members 16 and two uprights 14 that are attached singly to the side members 16 and positioned proximate to the crossmember 18 and between the crossmember 18 and the second end 24 of the base 12.

Figure 4:
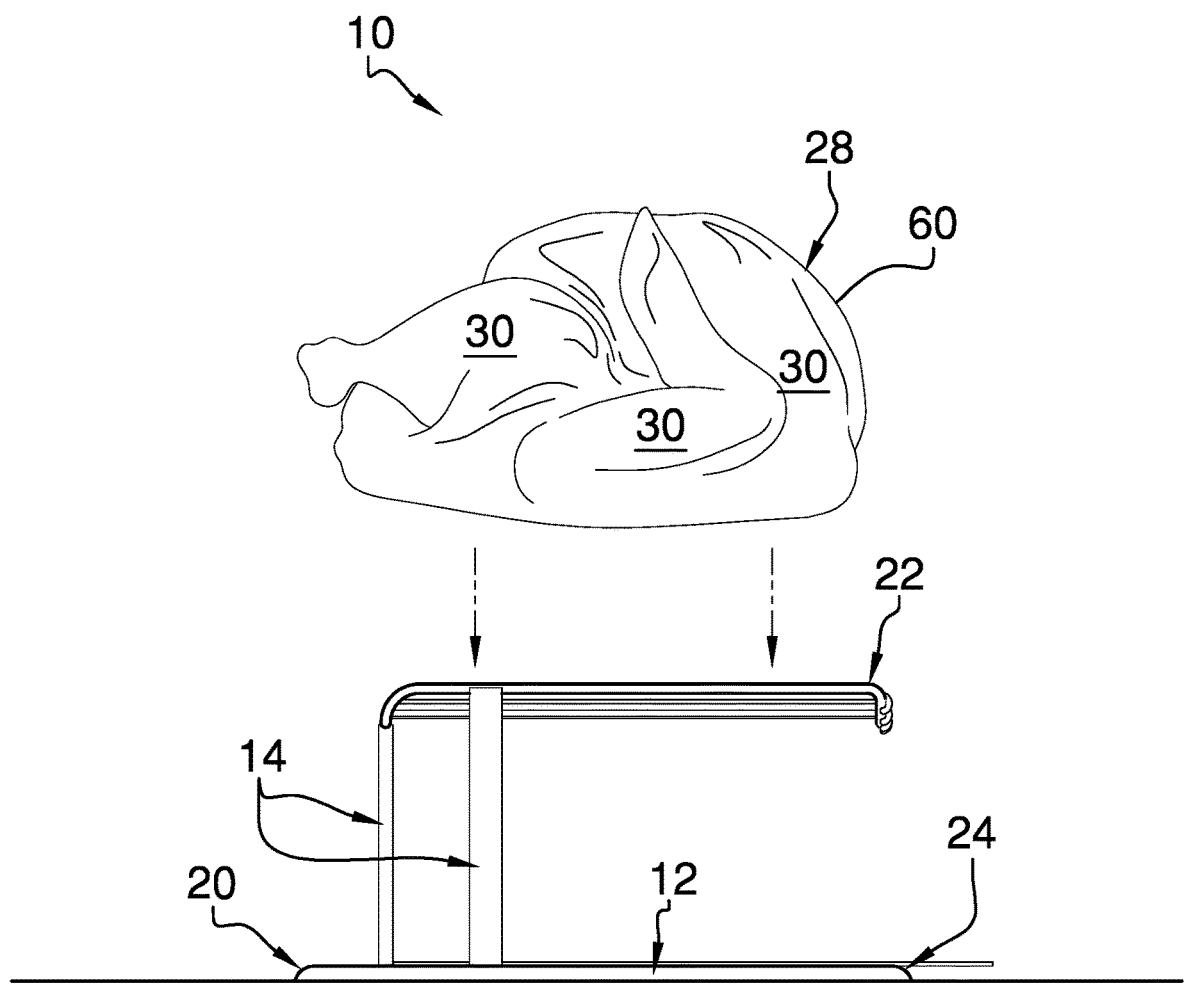
FIG. 4 is an in-use view of an embodiment of the disclosure.

A rack 22 is attached to the plurality of uprights 14 distal from the base 12 and extends substantially colinearly with the base 12 toward a second end 24 of the base 12. A top 26 of the rack 22 is configured for positioning of a food item, such as turkey 60, a chicken, a ham, or the like, as shown in FIG. 4. Surfaces 30 of the food item 28 are substantially accessible to a user and the food item 28 is slidable from the rack 22. The elevated rack device 10 facilitates initial prep work on the food item 28, such as rinsing, drying, trimming, seasoning, stuffing, and bagging. With the food item 28 being a turkey 60, the elevated rack device 10 allows for addition of fruit, vegetables, stuffing, and the like into an abdominal cavity of the turkey 60. The elevated rack device 10 facilitates bagging of the food item 28 prior to cooking. Bagging is readily accomplished by positioning a bag (not shown) over the food item 28 and the rack 22, sliding the bagged food item 28 off the rack 22 and into a roasting pan.

Figure 2:
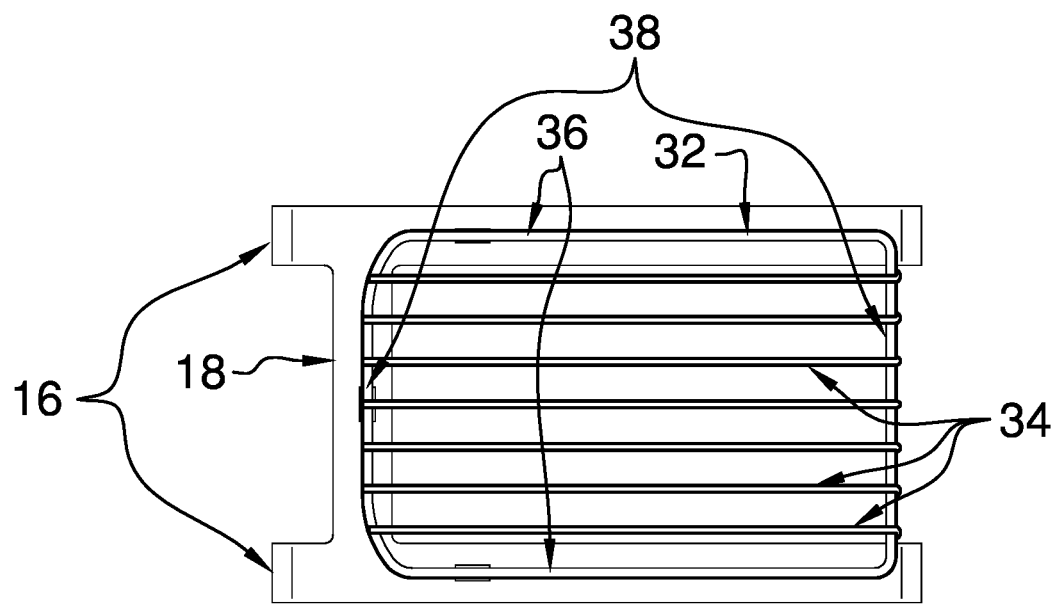
FIG. 2 is a top view of an embodiment of the disclosure.
Figure 3:
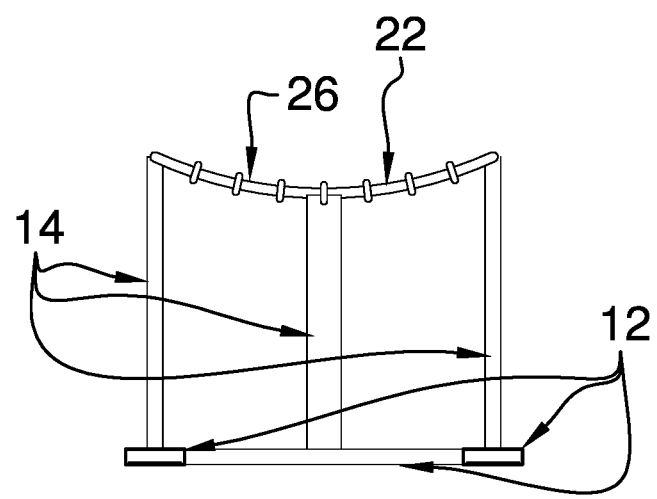
FIG. 3 is a front view of an embodiment of the disclosure.

The rack 22 comprises an annular rod 32 and a plurality of cross rods 34. The annular rod 32 has opposed side segments 36 and opposed end segments 38. Each cross rod 34 is attached to and extends between the opposed end segments 38 and is substantially parallel to the opposed side segments 36. The opposed end segments 38 are arcuate so that the rack 22 is concave when viewed from the top 26 of the rack 22, as shown in FIGS. 2 and 3. The rack 22 being concave helps to retain the food item 28 upon the rack 22.

Figure 5:
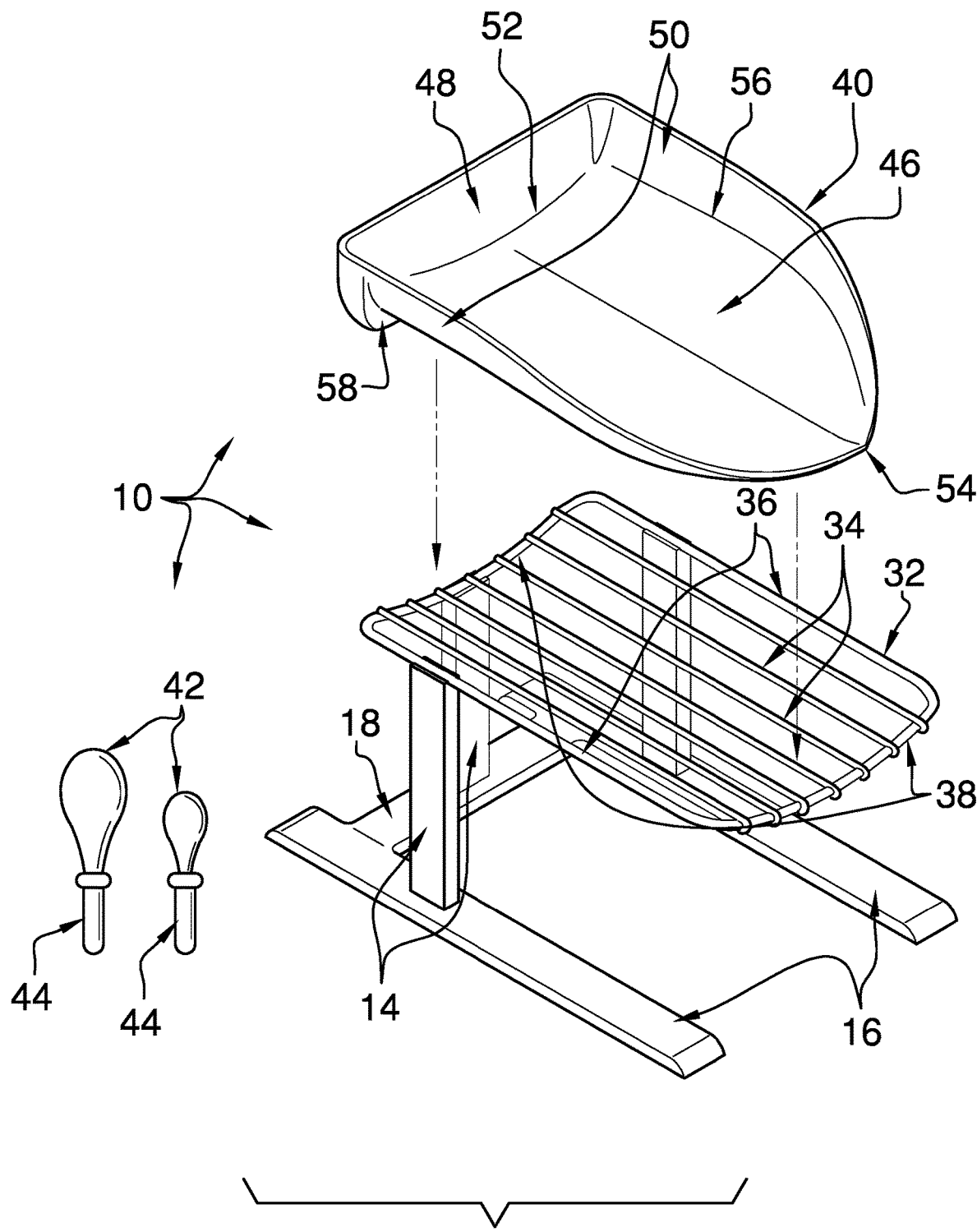
FIG. 5 is an isometric perspective view of an embodiment of the disclosure.

The elevated rack device 10 also may comprise a tray 40 and a plurality of scoops 42, as shown in FIG. 5. Each scoop 42 comprises a handle 44, which is configured to be grasped in a hand of the user, positioning the user to scoop the items and to position them in the tray 40.

The tray 40 comprises a lower panel 46, a rear panel 48, and a pair of side panels 50. The lower panel 46 is shaped substantially complementarily to the top 26 of the rack 22. The lower panel 46 has a first edge 52 and a second edge 54, with the latter being arcuate. The rear panel 48 is attached to and extends bidirectionally from the first edge 52 of the lower panel 46. A lower section 58 of the rear panel 48 is positioned to abut a respective opposed end segment 38 of the annular rod 32. Each side panel 50 is attached to the rear panel 48 and the lower panel 46. The side panel 50 extends along a respective opposed side edge 56 of the lower panel 46 and tapers toward the second edge 54 of the lower panel 46. The tray 40 is configured for positioning of items, such as, but not limited to, candies, ingredients, mirepoix, and the like. The rack 22 and the tray 40 are configured to be substantially covered with a bag, positioning a user to scoop or slide items from the tray 40 to transfer the items into a container, such as a bag.

In use, a food item 28 is positioned on the top 26 of the rack 22. The surfaces 30 of the food item 28 are substantially accessible to a user for initial prep work, such as rinsing, spices, drying, trimming, seasoning, stuffing. When preparing a turkey 60, items such as fruit, vegetables, and stuffing can be inserted into the turkey 60. The elevated rack device 10 allows a user to elect to bag the food item 28 prior to cooking. Bagging is readily accomplished by positioning a bag over the food item 28 and the rack 22, sliding the bagged food item 28 off the rack 22 and into a roasting pan.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An elevated rack device, comprising:
    a base;
    a plurality of uprights, each upright being attached to and extending substantially perpendicularly from the base proximate to a first end of the base; and
    a rack attached to the plurality of uprights distal from the base and extending substantially colinearly with the base toward a second end of the base, wherein a top of the rack is configured for positioning of a food item, such that surfaces of the food item are substantially accessible to a user, and such that the food item is slidable from the rack;
    wherein the base comprises:
        a pair of side members; and
        a crossmember, the crossmember being attached to and extending between the side members proximate to the first end of the base; and
    wherein the plurality of uprights comprises:
        an upright attached to the crossmember equally distant from the side members; and
        two uprights attached singly to the side members and positioned proximate to the crossmember between the crossmember and the second end of the base.

2. An elevated rack device, comprising:
    a base;
    a plurality of uprights, each upright being attached to and extending substantially perpendicularly from the base proximate to a first end of the base; and
    a rack attached to the plurality of uprights distal from the base and extending substantially colinearly with the base toward a second end of the base, wherein a top of the rack is configured for positioning of a food item, such that surfaces of the food item are substantially accessible to a user, and such that the food item is slidable from the rack; and
    wherein the rack comprises:
        an annular rod having opposed side segments and opposed end segments; and
        a plurality of cross rods, each cross rod being attached to and extending between the opposed end segments, the cross rod being substantially parallel to the opposed side segments; and wherein the plurality of uprights comprises: an upright attached to the crossmember equally distant from the side members; and two uprights attached singly to the side members and positioned proximate to the crossmember between the crossmember and the second end of the base.

3. The elevated rack device of claim 2, wherein the opposed end segments are arcuate, such that the rack is concave when viewed from the top of the rack.

4. The elevated rack device of claim 3, further including a tray comprising:
    a lower panel shaped substantially complementarily to the top of the rack, the lower panel having a first edge and a second edge, the second edge being arcuate;
    a rear panel attached to and extending bidirectionally from the first edge of the lower panel, such that a lower section of the rear panel is positioned for abutting a respective opposed end segment of the annular rod; and
    a pair of side panels, each side panel being attached to the rear panel and the lower panel, the side panel extending along a respective opposed side edge of the lower panel and tapering toward the second edge of the lower panel, wherein the tray is configured for positioning of items and wherein the rack and the tray are configured for substantially covering with a bag, positioning a user for tilting the tray for transferring the items into a container.

5. The elevated rack device of claim 4, further including a plurality of scoops, each scoop comprising a handle, wherein the handle is configured for grasping in a hand of the user, positioning the user for selectively scooping the items and positioning them in the tray and for sliding the items into the container.

6. An elevated rack device comprising:
   a base, the base comprising a pair of side members and a crossmember, the crossmember being attached to and extending between the side members proximate to a first end of the base;
   a plurality of uprights, each upright being attached to and extending substantially perpendicularly from the base proximate to the first end of the base, the plurality of uprights comprising:
      an upright attached to the crossmember equally distant from the side members, and
      two uprights attached singly to the side members and positioned proximate to the crossmember between the crossmember and a second end of the base; and
   a rack attached to the plurality of uprights distal from the base and extending substantially colinearly with the base toward the second end of the base, wherein a top of the rack is configured for positioning of a food item, such that surfaces of the food item are substantially accessible to a user, and such that the food item is slidable from the rack, the rack comprising:
      an annular rod having opposed side segments and opposed end segments, the opposed end segments being arcuate, such that the rack is concave when viewed from the top of the rack, and
      a plurality of cross rods, each cross rod being attached to and extending between the opposed end segments, the cross rod being substantially parallel to the opposed side segments.

7. The elevated rack device of claim 6, further including:
   a tray comprising:
      a lower panel shaped substantially complementarily to the top of the rack, the lower panel having a first edge and a second edge, the second edge being arcuate,
      a rear panel attached to and extending bidirectionally from the first edge of the lower panel, such that a lower section of the rear panel is positioned for abutting a respective opposed end segment of the annular rod, and
      a pair of side panels, each side panel being attached to the rear panel and the lower panel, the side panel extending along a respective opposed side edge of the lower panel and tapering toward a second edge of the lower panel, wherein the tray is configured for positioning of items and wherein the rack and the tray are configured for substantially covering with a bag, positioning a user for transferring the items into the container; and
   a plurality of scoops, each scoop comprising a handle, wherein the handle is configured for grasping in a hand of the user, positioning the user for selectively scooping the items and positioning them in the tray and for transferring the items from the tray to the container.

* * * * *